United States Patent [19]

Hart

[11] Patent Number: 4,609,127

[45] Date of Patent: Sep. 2, 1986

[54] TIMED DISPENSER OF FLUID ADDITIVES

[75] Inventor: Michael L. Hart, Eldridge, Iowa

[73] Assignee: Industrial Technology Corporation, Davenport, Iowa

[21] Appl. No.: 613,266

[22] Filed: May 24, 1984

[51] Int. Cl.4 ............................................... B67D 5/08
[52] U.S. Cl. ..................................... 222/66; 222/642; 222/644; 137/624.18
[58] Field of Search ............... 222/644, 642, 639, 643, 222/638, 318, 66; 137/624.11, 624.18, 624.2

[56] References Cited

U.S. PATENT DOCUMENTS

| | | | |
|---|---|---|---|
| 2,383,507 | 8/1945 | Martin | 222/66 X |
| 3,170,599 | 2/1965 | Pianowski et al. | 222/644 X |
| 3,628,617 | 12/1971 | Ferrigan | 222/318 X |

Primary Examiner—Joseph J. Rolla
Assistant Examiner—David H. Bollinger
Attorney, Agent, or Firm—Glenn H. Antrim

[57] ABSTRACT

A portable dispenser especially suitable for blending and dispensing bacterial solutions includes within a single housing a reservoir, a pump, a valve, self-contained batteries, and timing relays. The relays are readily adjustable for determining over a wide range the length of the dispensing periods and the length of time between them. A small, efficient pump is used for blending just before it is used for dispensing. For applications requiring small quantities of additives, the dispenser can function long periods unattended between refills of additives and replacements of batteries.

3 Claims, 2 Drawing Figures

TIMED DISPENSER OF FLUID ADDITIVES

BACKGROUND OF THE INVENTION

This invention relates to devices for adding either chemical or bacterial fluids to treat fluid systems such as water and sewage systems, and particularly to a dispenser requiring little power to blend additives, to discharge a selected amount, and to time periods of selected length between periods of discharge.

Water and sewage have often been treated with a minimum amount of equipment by merely adding chemicals and bacteria respectively by manual methods. Large waste treatment plants may have a timing switch controlling a plurality of motors for operating at selected times valves for discharging additives, controlling aeration, and flow of treated liquid through a reservoir. In large permanent installation, the moderate amount of power required for operation is readily available, and operation is inspected and manually controlled as required. The intervals for the different operations of a process are often fixed or are adjustable over only narrow limits and the amount of additives cannot be varied appreciably.

SUMMARY OF THE INVENTION

The present dispenser of additives is completely self-contained, portable, and is readily adjustable to dispense selected amounts of additives at selected intervals. Since the dispenser is self-contained and relatively small and since it requires neither monitoring nor servicing except when its reservoir requires refilling, it can be located where it is not readily accessible such as directly in a sewer line. The main housing of a preferred embodiment comprises a length of plastic pipe of quite large diameter, and the top and bottom ends are sealed by usual plastic end caps. A vertical plastic divider positioned in an axial plane displaced somewhat from the center divides the pipe into a larger vertical compartment as a reservoir for additive and a smaller vertical compartment for batteries, timing relays, and other electrical components; and a horizontal divider near the bottom below the vertical divider provides a bottom for the reservoir and a lower compartment for a pump and a valve. During short intervals of operation, the pump circulates additive within the reservoir from one point in the bottom of the reservoir to a spaced point through a normally open port of the valve, and then when the valve is operated discharges additive from the pump to a discharge line. The relays time a first interval between periods of discharge, a second interval for operating the pump and for recirculating additive through the pump and the normally open outlet of the valve back to the reservoir to blend additive such as a solution of bacteria, and a third interval in which the valve is operated to close the recirculating line and to open the line from the pump to the discharge tube. Ater a certain interval of discharge, the third interval is terminated, and the cycle of timing is repeated.

The selection of efficient operating components and their efficient use as determined by the timing circuits, that require very low power, contributes to the long life of the self-contained battery and the convenient long periods of unattended operation. The short periods of gentle blending as required to prepare solutions of bacteria and of certain chemicals are provided efficiently preceding intervals for discharging additive. Since the blending and the discharging are sequential rather than simultaneous, the required capacity of the pump is relatively low so that a relatively inexpensive, simple pump requiring little power is used. The main power circuit includes a switch that is controlled by a special float such that the power can be maintained on until the additive in the reservoir has reached a very low level and then turned off until the reservoir is refilled. dr

DESCRIPTION OF THE PREFERRED EMBODIMENT

Figure 1:
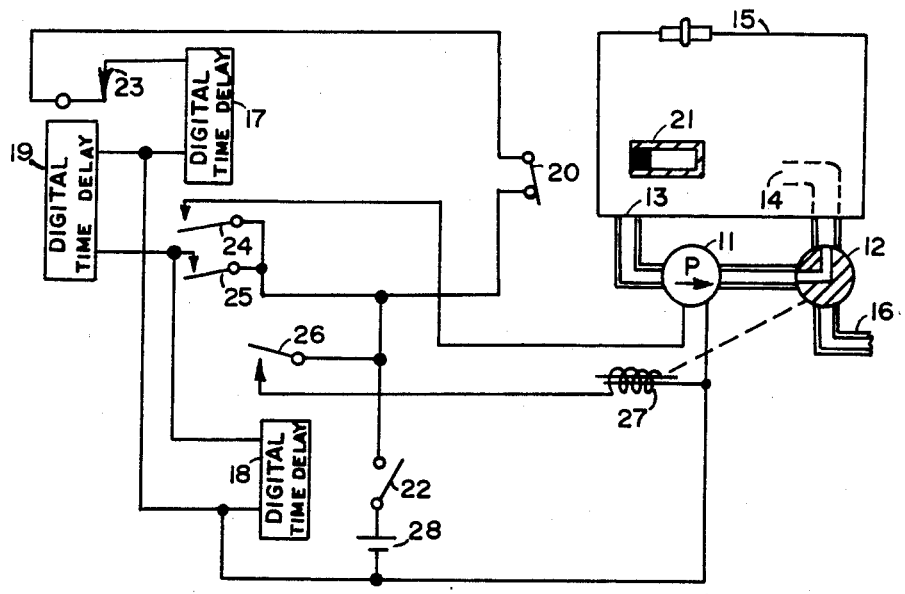
FIG. 1 is a schematic diagram of the timing circuits of this invention interconnected with a diagram of the components for controlling and discharging of additives.

A pump 11 and an electrically operated valve 12 as shown in FIG. 1 are connected in series between an outlet 13 and an inlet 14 within the bottom of a reservoir 15. The valve 12 has in addition to a normally open port connected to the inlet 14 of the reservoir 15 a normally closed port connected to a discharge line 16. The valve 12 is conveniently a three-way valve rather than two separate valves. A controlling portion and the inlet 14 function as a first valve means to control circulation, and the controlling portion and the discharge line 16 function as a second valve means to discharge liquid from the reservoir 15. After a first interval determined by a time-delay-switching means comprising mainly digital-time-delay relays 17–19, the pump 11 is started to circulate additive within the reservoir 15 through the normally open port of the valve 12. After a second interval, the valve 12 is operated to stop flow from the outlet of the pump 11 back into the reservoir 15, and to start flow from the pump to the discharge line 16 for discharging a measured amount of additive to fluid being treated.

In detail, providing a microswitch 20 controlled by a float 21 within the reservoir 15 is closed, the closing of an ON-switch 22 completes a circuit from a battery 28 through the switch 20, contacts 23 of the digital-time-delay relay 19 and the winding of the first digital-time-delay relay 17 to start the first timing interval. At the end of this first interval determined by setting the digital-time-delay relay 17, the relay operates to close its contacts 24 and 25. Circuits that can be readily traced from the battery 28 through the contacts 25 and the windings of the second digital-time-delay relay 19 and a third digital-time-delay relay 18 are closed to start respective timing intervals by these relays. The controlling portion of this circuit including the contacts 25 is conveniently called a fourth control switching circuit. Similarly, the contacts 24 comprise a first control switching circuit for controlling a first operating circuit connected to the pump 11. Power from the battery 28 is applied through the contacts 24 to start operation of the pump 11. Although the digital-time-delay relay 19 times for a relatively short period during operation of the pump 11, the digital-time-delay relay 18 times for even a shorter period for determining the time of operation of the valve 12. While the relay 17 is operated but before either relay 18 or 19 is operated, the pump 11 operates to recirculate additive in reservoir 15 through the first valve means including the normally open port of the valve 12. When the relay 18 operates, a second control switching circuit is closed through contacts 26 from the battery 28 to complete a second operating circuit including an operating winding 27 of the valve 12 for transferring output of the pump 11 to the discharge line 16. Since in many applications of this dispenser of additives, the interval for discharging is quite short compared with the other intervals, the additive in the reservoir 15 will last a long time. The relays 18 and 19 start their timing intervals at the same instant, and the period of operation of the valve 12 is determined by the difference in their timing intervals. Shortly after the operation of the relay 18 at the end of a third interval, the digital-time-delay relay 19 operates momentarily to open a third control switching circuit by opening normally closed contact 23 and therefore momentarily opens the operating circuit of the digital-time-delay relay 17. In response to the momentary deenergization of the winding of the relay 17, its contacts 24 and 25 open to disconnect the power from the pump 11 and from the windings of relays 18 and 19. Contacts 26 of the released relay 18 return to their normally open position for the returning the valve 12 to its normal position, and released relay 19 permits its contacts 23 to be reclosed for again starting the timing of the initial interval by digital-time-delay relay 17. The sequence continues until either the switch 20 controlled by the float 21 or the ON-switch 22 are opened. Restating to clarify timing, in response to initial operation of the OFF-ON switch 22, the timing delay switching circuits comprising the relays 17–19 recycle continuously for timing and switching. At the end of a dispensing cycle, contacts 23 of the relay 19 close again to start timing of a predetermined first interval at the end of which the relay 17, a first relay, operates. The operation of the relay 17 at the end of the first interval starts operation of the pump 11 and closes through contacts 25 operating circuits of the relay 19, a second relay, and of the relay 18, a third relay. Each of these relays 18 and 19 starts timing simultaneously. The relay 18 is set for a shorter timing period, a second interval, and operates next at the end of the second interval for operating the valve 12. A third timing interval, during which the pump 11 continues operation and the operating winding 27 of the valve 12 is energized, is determined by the difference in the timing period of the relay 18 and the somewhat longer timing period of the relay 19. The operation of the relay 19 terminates the third interval by opening the contacts 23 for releasing the relay 17. Upon releasing, the relay 17 stops the pump 11 and at contacts 25 opens the operating circuits of the relays 18 and 19 which release immediately. The relay 19 is therefore energized only momentarily to end a cycle of operation and upon being released again through the normally closed contacts 23 starts the timing of the first interval of a subsequent cycle.

In a preferred model for mixing bacteria, each of the relays 17–19 is a commercially available type having binary switches adjustable by a pointed instrument. Usually, the interval over which relay 17 is adjustable is longer than the interval for relays 18 and 19. In a typical dispenser, the period between mix-and-feed intervals may be adjusted between 10 seconds and 170 minutes and the mix-and-feed interval may be adjusted between 0.1 second and 1.7 minutes.

Figure 2:
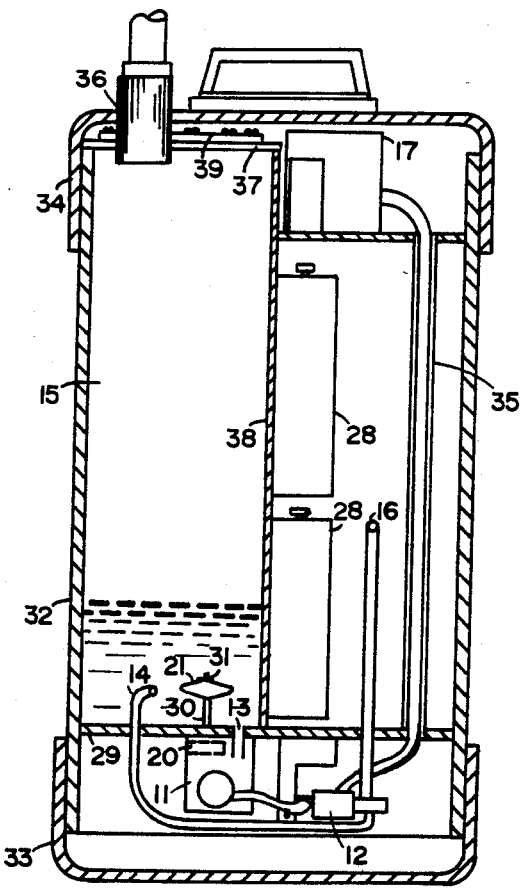
FIG. 2 is a diametrical cross-sectional view of a cylindrical dispenser having the timing circuits and dispensing components of FIG. 1.

The mounting position of the microswitch 20 and the construction of the special float 21 is shown in FIG. 2. The microswitch 20 is connected below a plastic bottom 29 of the reservoir 15, and the float 21 is mounted on a rod 30 extending upwardly from the plastic bottom at a position over the microswitch 20. The float may be a hollow lenticular body having a powdered magnetic core 31. The core has an inside diameter slightly greater than the diameter of the rod 30 and has a removable collar at its upper end to prevent the float from being raised above the end of the rod. The microswitch 20 is normally closed, and its movable contact will not be attracted toward the core 31 for opening the switch until the float 21 is quite close to the bottom 29 as the level of the additive in the reservoir 15 reaches a very low level.

The usual means of construction are used to assemble the dispenser according to this brief description. A length of cylindrical, plastic pipe 32, such as s sewer pipe, is enclosed by a lower end cap 33 as a bottom and an upper end cap 34 as a top. The top has a required hole and a seal about a filler-plug-and-vent 36 of the reservoir 15. Plastic partitions within the main body 32 include a transverse plate 29 for the bottom of both the reservoir and an adjacent battery compartment, and a longitudinal plastic plate 38 extending cross the pipe 32 sealed to its edges to function as a side of the reservoir 15. The bottom edge of the plate 38 is sealed to the surface of the bottom plate 29, and the upper edge of the plate 38 is sealed to the edge of a top plastic plate 37. For access to the interior of the reservoir 15, a circular cover 39 with a seal near its edge may be held to the top 37 by thumb screws. In a preferred model, the longitudinal plate 38 that is a side of the reservoir 15 may be positioned off center such that the reservoir 15 comprises somewhat greater than one-half the cross-sectional space within the pipe 32.

The fluid control components including namely the pump 11 and the valve 12 are mounted below the bottom 29; the batteries 28 are mounted in a compartment also formed by the longitudinal plate 38 along a side of the reservoir 15; and the relay 17 along with relays 18 and 19 and other electrical components are mounted on a shelf above the batteries outside the top portion of the reservoir 15. Control wires from the relays 17–19 extend doward through a conduit 35 along the outer portion of the battery compartment containing the batteries 28 to the lower compartment for connection to the pump 11 and the valve 12.

To obtain blending economically, the inlet 13 connecting the bottom of the reservoir 15 to the inlet of the pump 11 is spaced quite far from the outlet 14 connected to the valve 12. The outlet 14 is preferably a rigid piece of tubing that is directed horizontally at a slant toward the circular wall of the reservoir 15 in a direction somewhat toward the inlet 13. In this manner, a swirling action is obtained from a small, economical pump to intensify the blending action. The discharge line 16 is connected to a nipple that extends through the wall of the pipe 32, and any convenient length of tubing may be connected to the nipple for discharging additive from the reservoir 15 to a desired location. For convenience in handling, the dispenser may be a convenient height for an averge man to carry by grasping a handle connected to the upper end cap or top 34.

Auxiliary standard components that are not shown are desirable for many applications. For example, a tubular height gauge can be connected through the wall of the main body 32 to the reservoir 15. A sealed power receptacle may be placed through the wall of the main body 32 to the battery compartment for installing an alternating-current power receptacle. This receptacle can then be used where power lines are available to operate a 12-volt direct-current power supply to be used in place of the batteries 28; the added power supply may be located below the bottom transverse plate 29. In a conventional manner, a relay connected to the alternating-current circuits can transfer automatically the operating circuits from the battery 28 to the power supply. Usual low-voltage indicators connected to the batteries are desirable. If desired, a push-button switch may be connected across contacts 24 for testing operation of the pump 11, and likewise, a push-button switch may be connected across contacts 26 for testing operation of the valve 12.

I claim:

1. A dispenser of fluid additives comprising:
   a reservoir having an inlet through the bottom thereof at a first position and an outlet through said bottom at a second position spaced at a substantial distance from said first position,
   an electric pump having an inlet and an outlet, said inlet of said pump being fluidly connected to said outlet of said reservoir, fluid control means for selectively connecting said outlet of said electric pump to said inlet of said reservoir and a discharge pipe, said fluid control means normally being connected to permit flow of fluid to said inlet of said reservoir such that said pump when operated normally being effective to circulate and thereby to blend said additives within said reservoir, said fluid control means having an electrical controlling circuit to be energized to electively connect said electric pump with said inlet of said reservoir and said discharge pipe,
   a first operating circuit connected to said pump and a second operating circuit connected to said electrical controlling circuit of said fluid control means,
   timing delay switching circuits having a first control switching circuit connected to said first operating circuit and a second control switching circuit connected to said second operating circuit,
   means for starting operation of said timing delay switching circuits to determine successively and repeatably first, second, and third timing intervals for determining intervals of operation of said first and second control switching circuits and thereby determining intervals of operation of said pump and said fluid control means, said first control switching circuit operating at the end of said first interval to start operation of said pump to blend said additive, said second control switching circuit operating at the end of said second interval for energizing said electrical controlling circuit of said fluid controlling means to interrupt blending of said additives and to discharge said additives from said discharge pipe, both said first and second control switching means operating at the end of said third interval to stop operation of said pump, to connect said fluid control means to said inlet of said reservoir means, and said timing delay switching means at the end of said third interval again starting timing of said first interval.

2. A dispenser of fluid additive as claimed in claim 1 wherein said timing delay switching circuits comprises first, second, and third digital-time-delay relays, each of said relays having an operating circuit to be closed for starting timing of an interval before operation thereof, said first digital-time-delay relay having said first control switching circuit, said third digital-time-delay relay having said second control switching circuit, said second digital-time-delay relay having a third control switching circuit, said operating circuit of said first digital-time-delay relay being controlled by said means for starting operation of said switching means and also by said third control switching circuit, said first digital-time-delay relay having a fourth control switching circuit connected to said operating circuits of said second and third digital-timing-delay relays, said first digital-time-delay relay operating at the end of said first interval to close said fourth control switching circuit for starting timing of said second and third digital-timing-delay relays and to close said first control switching circuit for starting operation of said pump, said third digital-time-delay relay operating at the end of said second interval to operate said second control switching circuit for connecting said fluid control means with discharge pipe, thereby discharging said additives while stopping circulation for blending, and said second digital-time-delay relay operating at the end of said third interval to open said third control switching circuit for restarting timing of said first digital-time-delay relay, said first digital-time-delay relay upon restarting timing opening said first control switching circuit to stop operation of said pump and opening said fourth control switching circuit connected to said operating circuits of said second and third digital-time-delay relays.

3. A dispenser for fluid additives as claimed in claim 1 wherein said circuit for starting operation of said timing delay switching circuit includes a micro-switch, said micro-switch being normally in a closed position for starting, a magnet movable close to said micro-switch to operate said micro-switch to an open position to prevent starting of said timing delay switching circuit, said magnet being cylindrical, a lenticular float having said cylindrical magnet as an axial core, a rod extending upward from said bottom of said reservoir, said magnet being a sliding fit about said rod, and said micro-switch being positioned below said rod and being opened in response to a lower position of said float at only very low levels of fluid within said reservoir, said micro-switch when open preventing said operation of said timing delay switching circuit.

* * * * *

UNITED STATES PATENT AND TRADEMARK OFFICE
CERTIFICATE OF CORRECTION

PATENT NO. : 4,609,127

DATED : September 2, 1986

INVENTOR(S) : Michael L. Hart

It is certified that error appears in the above-identified patent and that said Letters Patent is hereby corrected as shown below:

Column 5, claim 1, line 32, "electively" should read
-- selectively --.

Signed and Sealed this

Twenty-third Day of December, 1986

Attest:

DONALD J. QUIGG

Attesting Officer      Commissioner of Patents and Trademarks